US009138823B2

(12) United States Patent
Koprivnak et al.

(10) Patent No.: US 9,138,823 B2
(45) Date of Patent: Sep. 22, 2015

(54) SYSTEMS AND METHODS PROVIDING ARC RE-IGNITION FOR AC ARC WELDING PROCESSES

(71) Applicant: Lincoln Global, Inc., City of Industry, CA (US)

(72) Inventors: George B. Koprivnak, Painesville, OH (US); Robert L. Dodge, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 256 days.

(21) Appl. No.: 13/675,424

(22) Filed: Nov. 13, 2012

(65) Prior Publication Data

US 2014/0131331 A1 May 15, 2014

(51) Int. Cl.
*B23K 9/073* (2006.01)
*B23K 9/10* (2006.01)

(52) U.S. Cl.
CPC ............ *B23K 9/1006* (2013.01); *B23K 9/0738* (2013.01)

(58) Field of Classification Search
USPC .............. 219/130.1, 130.01, 130.32, 130.33, 219/130.4
See application file for complete search history.

(56) References Cited

U.S. PATENT DOCUMENTS 1,993,852 A 3/1935 Miller
3,657,724 A 4/1972 Feeley et al.
4,322,602 A 3/1982 Grist
4,371,776 A 2/1983 Winn
4,544,826 A * 10/1985 Nakanishi et al. ...... 219/137 PS
4,972,064 A 11/1990 Stava
5,338,916 A 8/1994 Blankenship et al.
5,343,017 A * 8/1994 Karino et al. ............. 219/130.4
5,710,696 A 1/1998 Reynolds et al.
5,958,261 A 9/1999 Offer et al.
6,034,350 A 3/2000 Heraly et al.
6,051,810 A * 4/2000 Stava ...................... 219/137 PS
6,215,100 B1 4/2001 Stava
6,384,373 B1 5/2002 Schwartz (Continued)

FOREIGN PATENT DOCUMENTS

CA 2139715 8/1995
DE 19828869 12/1999

(Continued)

OTHER PUBLICATIONS

Dynasty 200 SD and DX TIG Welders; MillerWelds; 2 pgs.; http://www.millerwelds.com/products/tig.

(Continued)

*Primary Examiner* — Brian Jennison
(74) *Attorney, Agent, or Firm* — Hahn, Loeser & Parks, LLP

(57) ABSTRACT

Systems and methods providing an energy limited arc re-ignition voltage for AC arc welding processes to re-ignite an arc during polarity transitions. In arc welding power source embodiments, configurations of bridge and superposition circuits allow for the directional switching of the welding output current through the welding output circuit path and provide a voltage between the electrode and the workpiece of the welding output circuit path that is sufficient to re-ignite the arc during polarity transition of the output current. The superposition circuit provides a capacitor for storing energy from a dedicated charging source which produces the voltage level for re-igniting the arc during the zero crossing of the output current in both polarities.

21 Claims, 13 Drawing Sheets

210 DC POWER SOURCE (CHOPPER BASED) 180 300 100V BUS 1000uF 400V ACTIVE SNUBBER 0.1uF Precharge Supply ON OFF E W LOAD 230

(56) References Cited

U.S. PATENT DOCUMENTS

| | | | |
|---|---|---|---|
| 6,833,529 | B2 | 12/2004 | Ueyama et al. |
| 7,385,159 | B2 | 6/2008 | Stava |
| 7,919,728 | B2 | 4/2011 | Era et al. |
| 8,067,714 | B2 | 11/2011 | Era et al. |
| 8,299,398 | B2 | 10/2012 | Madsen |
| 2004/0074884 | A1 | 4/2004 | Butler |
| 2008/0264915 | A1 | 10/2008 | Manthe et al. |
| 2012/0118865 | A1 | 5/2012 | Stava et al. |
| 2013/0162136 | A1 | 6/2013 | Baldwin et al. |

FOREIGN PATENT DOCUMENTS

| | | |
|---|---|---|
| DE | 20114660 | 2/2002 |
| DE | 10245368 | 4/2004 |
| EP | 0538227 | 4/1993 |
| GB | 1069512 | 5/1967 |
| GB | 2081156 | 2/1982 |
| JP | 63171267 | 7/1988 |
| JP | 2002096167 | 4/2002 |
| WO | 9839138 | 9/1998 |

OTHER PUBLICATIONS

PCT/IB2013/002523—International Preliminary Report on Patentability—May 19, 2015.

* cited by examiner 300
300
180
180
230
230
210
210
DC POWER SOURCE (CHOPPER BASED)
DC POWER SOURCE (CHOPPER BASED)
100V BUS
100V BUS
1000uF
1000uF
400V ACTIVE SNUBBER
400V ACTIVE SNUBBER
0.1uF
0.1uF
Precharge Supply
Precharge Supply
LOAD2
LOAD3
ON
OFF
W
E 180
500
210
230
DC POWER SOURCE (CHOPPER BASED)
100V BUS
400V ACTIVE SNUBBER
1000uF
0.1uF
Precharge Supply
LOAD
LOAD1
ON
OFF
E
W 180
500
230
210
W
E
ON
OFF
LOAD2
LOAD3
0.1uF
500
400V
ACTIVE
SNUBBER
1000uF
Precharge
Supply
DC POWER SOURCE
(CHOPPER BASED)
100V
BUS 180
160
170
210
DC POWER SOURCE
611
612
613
614
615
616
617
619
682
683
191
192
E
W 700
180
230
210
DC POWER SOURCE (CHOPPER BASED)
100V BUS
400V ACTIVE SNUBBER 1000uF
Precharge Supply
500
0.1uF
ON
OFF
LOAD
LOAD1
E
W 180
700
230
210
DC POWER SOURCE (CHOPPER BASED)
100V BUS
400V ACTIVE SNUBBER 1000uF
Precharge Supply
0.1uF
500
ON
OFF
LOAD2
LOAD3
E
W

SYSTEMS AND METHODS PROVIDING ARC RE-IGNITION FOR AC ARC WELDING PROCESSES

TECHNICAL FIELD

Certain embodiments of the present invention relate to arc welding. More particularly, certain embodiments of the present invention relate to systems and methods providing an energy limited arc re-ignition voltage for AC arc welding processes to re-ignite an arc during polarity transitions.

BACKGROUND

Certain prior art welding systems use bridge topologies in a welding power source to provide AC welding capability. A full bridge topology may be used with just about any power source topology, providing flexibility and the potential to be added to existing designed power sources. The full bridge topology allows easy implementation of zero cross assisting circuits. A blocking diode may be used to protect the devices in the power source from high voltage transients that occur during the zero cross. For certain welding processes such as, for example, an AC gas tungsten arc welding process (GTAW or TIG) or an AC gas metal arc welding process (GMAW or MIG), it is desirable for the arc between the electrode and the workpiece to quickly re-ignite in the opposite polarity direction when the welding current crosses zero.

A welding power source may have a maximum voltage level (e.g., 100 VDC) that it is designed to output. When an AC welding current crosses zero (i.e., changes polarity), the arc extinguishes and may not re-establish. In TIG welding (where there is no wire electrode), if the arc extinguishes, the welding power source may have to repeat the entire arc-establishment process before welding can continue, resulting in an inefficient welding process.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments of the present invention include systems and methods for providing an energy limited arc re-ignition voltage (i.e., a superposition voltage) for AC arc welding processes to re-ignite an arc during polarity transitions. The introduction of a high voltage level between the welding electrode and the workpiece for a brief period of time during a polarity transition of the welding current is provided from a superposition circuit having a dedicated charging source to readily and reliably re-ignite the arc in the opposite polarity, even though the voltage from the power source is limited. Configurations of polarity reversing bridge circuits and superposition circuits allow for the directional switching of the output welding current through the welding output circuit path while also allowing for the rapid re-igniting of the arc when the welding current changes polarity. A superposition circuit having a pre-charge capacitor and a charging source that is dedicated to charging the pre-charge capacitor provides the voltage needed during current polarity transition to quickly and reliably re-ignite the arc.

One embodiment of the present invention is a welding power source. The welding power source includes a controller, and a power conversion circuit configured to convert an input current to an output current. The power conversion circuit may include a DC output topology. The power conversion circuit may be an inverter-based circuit or a chopper-based circuit, for example. The welding power source also includes a bridge circuit operatively connected to the power conversion circuit and configured to switch a direction of the output current through a welding output circuit path operatively connected to a welding output of the welding power source at the command of the controller. The bridge circuit may be configured as a full bridge circuit, for example. The bridge circuit may include, for example, at least four switching transistors. The welding power source further includes a superposition circuit, having at least one pre-charge capacitor and at least one dedicated charging source configured to directly or indirectly charge the at least one capacitor, operatively connected to the bridge circuit and configured to provide a voltage between an electrode and a workpiece of the welding output circuit path sufficient for arc re-ignition during polarity transition of the output current. The dedicated charging source may be a current limited voltage supply. The superposition circuit may also include, for example, at least one resistor and at least one switching transistor operatively connected to the at least one capacitor, wherein the at least one switching transistor is configured to switch on and off at the command of the controller. The value of the at least one capacitor may be less than one micro-farad, in accordance with various embodiments. The power conversion circuit, the bridge circuit, and the superposition circuit may be configured to provide any of a DC positive welding operation, a DC negative welding operation, and an AC welding operation at the command of the controller of the welding power source. In accordance with an alternative embodiment, the bridge circuit and the superposition circuit may be external to the welding power source, for example, in the form of a module that operatively connects to the welding power source.

One embodiment of the present invention is a welding power source. The welding power source includes means for converting an input current to an output current and means for switching a direction of the output current through a welding output circuit path operatively connected to a welding output of the welding power source to provide at least an AC welding operation. The welding power source also includes means for applying a voltage between a welding electrode and a welding workpiece of the welding output circuit path during a polarity transition of the output current to automatically re-establish an arc between the welding electrode and the workpiece in an opposite polarity.

One embodiment of the present invention is a method. The method includes converting an input current to an output current in a welding power source and pre-charging at least one capacitor of the welding power source to an arc re-igniting voltage level from at least one dedicated charging source. The method also includes switching a direction of the output current through a welding output circuit path operatively connected to a welding output of the welding power source from a first direction to a second direction at the command of a controller of the welding power source. The method further includes applying the arc re-igniting voltage level from the at least one capacitor between a welding electrode and a workpiece of the welding output circuit path to automatically re-ignite an arc between the electrode and the workpiece in the second direction as part of switching to the second direction. The method may further include pre-charging the at least one capacitor of the welding power source to the arc re-igniting voltage level from the at least one dedicated charging source and switching a direction of the output current through the welding output circuit path from the second direction to the first direction at the command of the controller of the welding power source. The method may further include applying the arc re-igniting voltage level from the at least one capacitor between the welding electrode and the workpiece of the welding output circuit path to automatically re-ignite an arc between the electrode and the workpiece in the first direction as part of switching to the first direction. The method may further include further charging the at least one capacitor of the welding power source with energy from a load connected to the welding power source during a current decay portion of the output current to self-regulate arc re-ignition based on characteristics of the load.

One embodiment of the present invention is a welding power source. The welding power source includes a bridge circuit configured to provide an AC welding output current. The welding power source further includes a superposition circuit, including at least one capacitor and at least one dedicated charging source configured to directly or indirectly charge the at least one capacitor, operatively connected to the bridge circuit and configured to provide a voltage at a welding output of the welding power source being of sufficient magnitude to automatically re-ignite an arc in an output circuit path connected to the welding output upon reversal of a polarity of a welding output current through the output circuit path. The superposition circuit may further include at least one resistor and at least one switching transistor operatively connected to the at least one capacitor, wherein the at least one switching transistor is configured to switch on and off at the command of the welding power source.

One embodiment of the present invention is a welding power source. The welding power source includes a current switching circuit having at least one pre-charge capacitor and at least one dedicated charging source configured to directly or indirectly charge the capacitor, wherein the at least one pre-charge capacitor and the at least one dedicated charging source are configured to provide a voltage across a load connected to a welding output of the welding power source sufficient to re-ignite a welding arc across the load upon reversal of a polarity of a welding output current through the load. The current switching circuit may be configured as a full bridge circuit, for example. The current switching circuit may include at least one resistor and at least one switching transistor operatively connected to the at least one pre-charge capacitor, wherein the at least one switching transistor is configured to switch on and off at the command of the welding power source.

Details of illustrated embodiments of the present invention will be more fully understood from the following description and drawings.

DETAILED DESCRIPTION

Figure 1:
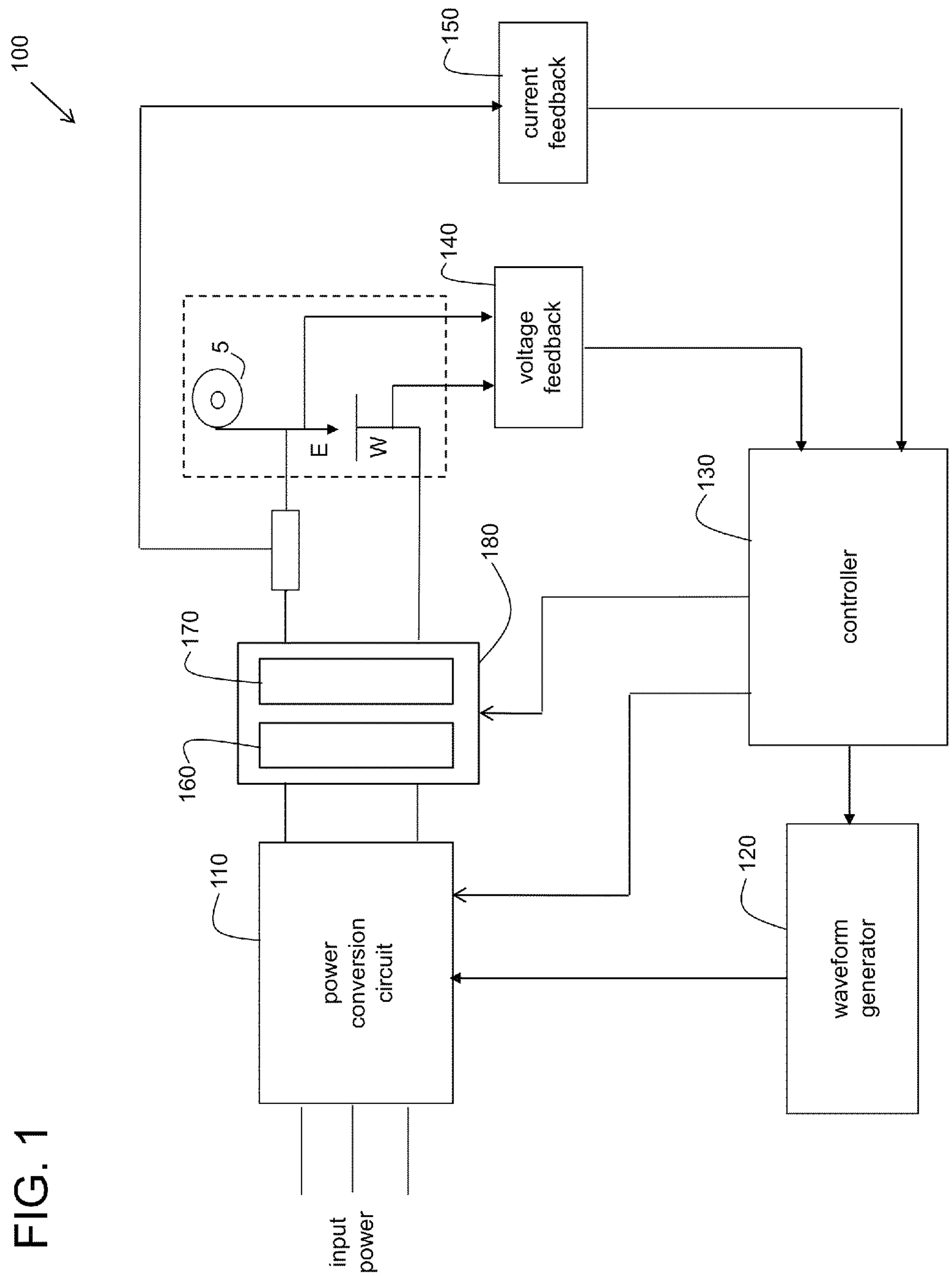
FIG. 1 illustrates a schematic block diagram of an exemplary embodiment of a welding power source operatively connected to a welding electrode and a workpiece.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that accepts a consumable or non-consumable welding electrode for the purpose of applying electrical power to the welding electrode provided by a welding power source.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source.

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source.

The terms "signal", "data", and "information" may be used interchangeably herein and may be in digital or analog form.

The term "AC welding" is used generally herein and may refer to actual AC welding, DC welding in both positive and negative polarities, variable polarity welding, and other hybrid welding processes.

The terms "pre-charge capacitor" and "superposition capacitor" may be used interchangeably herein.

For AC welding processes, the arc current stops and changes direction during the zero transition. Depending on the state of the arc plasma and gases surrounding the weld, the arc may or may not re-ignite. Embodiments of the present invention include a superposition circuit providing a voltage level being of sufficient magnitude to automatically re-ignite an arc upon reversal of a polarity of the welding output current. During a polarity change, the arc current decays to zero prior to advancing in the opposite polarity. During this polarity transition time, the current from the arc flows into a high voltage snubber circuit. The high voltage imposed by the snubber circuit rapidly depletes all of the arc energy. The arc re-ignition voltage is provided by a capacitor of the superposition circuit that applies the voltage across the welding load upon command by a controller, thus re-establishing the arc across the load.

FIG. 1 illustrates a schematic block diagram of an exemplary embodiment of a welding power source 100 operatively connected to a welding electrode E and a workpiece W. The welding power source 100 includes a power conversion circuit 110 providing welding output power between the welding electrode E and the workpiece W. The power conversion circuit 110 may be transformer based with a half bridge rectified output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. An optional wire feeder 5 may feed a consumable wire welding electrode E toward the workpiece W. Alternatively, as in a GTAW process, the electrode E may be non-consumable and the wire feeder 5 may not be used or may be used to provide a filler wire toward the workpiece W. The wire feeder 5, the consumable welding electrode E, and the workpiece W are not part of the welding power source 100 but may be operatively connected to the welding power source 100 via a welding output cable.

The welding power source 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W.

The welding power source 100 may further include a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect safe operation of the welding power source 100, for example.

The welding power source 100 also includes a current switching circuit 180 having a bridge circuit 160 and a superposition circuit 170. The bridge circuit 160 is operatively connected to the power conversion circuit 110 and is configured to switch a direction of the output current through a low impedance welding output circuit path (including the electrode E and the workpiece W) operatively connected to a welding output of the welding power source 100 at the command of the controller 130. The superposition circuit is an energy limited arc re-ignition circuit that provides a high voltage at the welding output (output port or terminals) of the welding power source for a brief period of time. The superposition circuit is operatively connected to the bridge circuit and is configured to provide a voltage between the electrode E and the workpiece W of the welding output circuit path that is sufficient to re-ignite the arc during a polarity transition of the output current. The superposition circuit includes a dedicated charging source that is used to pre-charge a capacitor of the superposition circuit to the sufficient voltage before polarity transition occurs. Detailed examples and operation of such bridge and superposition circuits are described in detail later herein.

Figure 2:
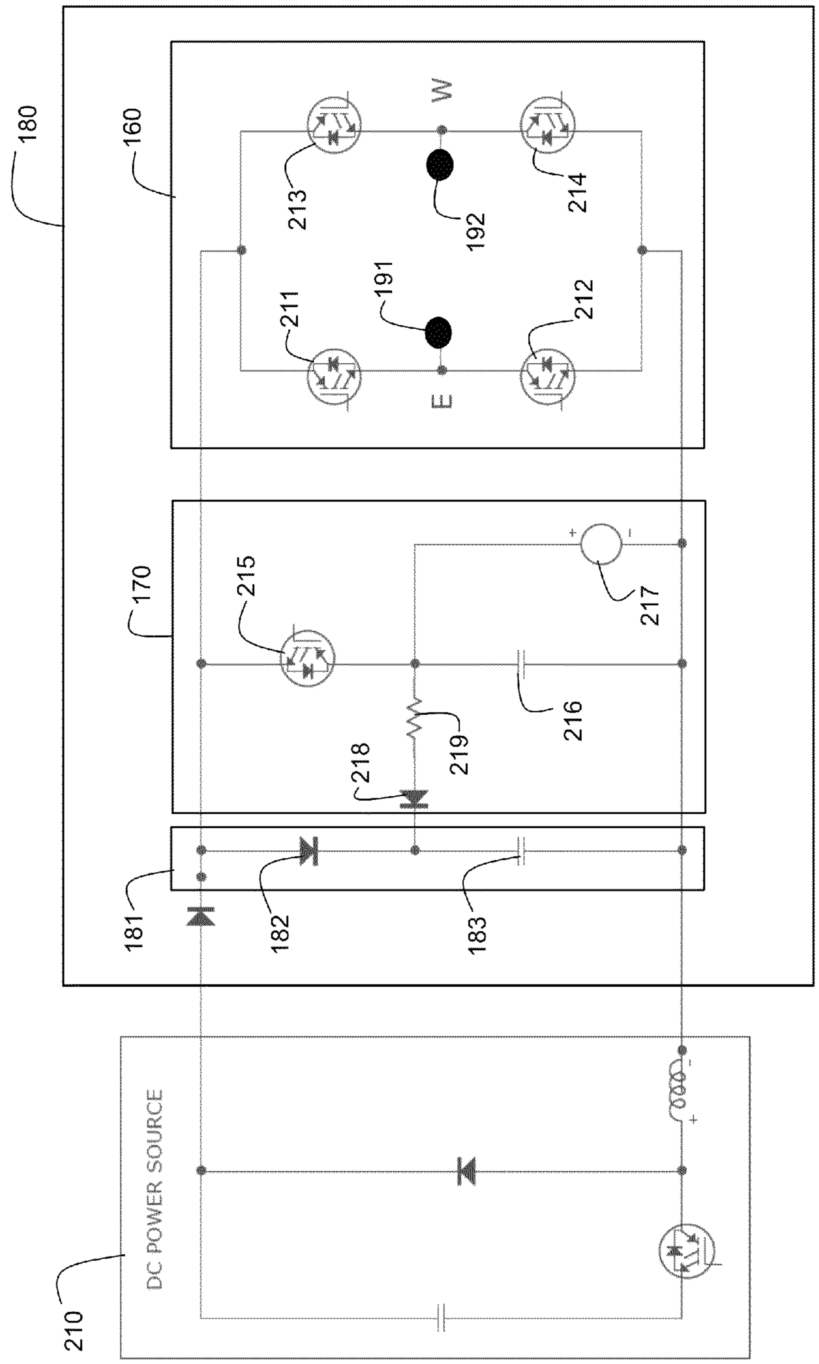
FIG. 2 illustrates a schematic diagram of a first exemplary embodiment of a portion of the welding power source of FIG. 1 having a bridge circuit and a superposition circuit.

FIG. 2 illustrates a schematic diagram of a first exemplary embodiment of a portion of the welding power source 100 of FIG. 1 having a bridge circuit 160 and a superposition circuit 170. Also illustrated in FIG. 2 is a portion 210 of the power conversion circuit 110, where the power conversion circuit 110 provides a DC+output (e.g., a chopper-based circuit). The current switching circuit 180 of FIG. 2 is in the form of a full bridge topology that may be used with almost any power source topology, providing flexibility and the potential to be added to existing designed power sources, and providing AC current switching through the welding output circuit path.

The bridge circuit 160 includes switching transistors 211, 212, 213, and 214. The superposition circuit 170 includes switching transistor 215, pre-charge capacitor 216, dedicated charging source 217, diode 218, and resistor 219. In accordance with an embodiment, the switching transistors are insulated gate bipolar transistors (IGBTs). In accordance with an embodiment, the dedicated charging source is a voltage supply created off of a transformer that is current limited and is dedicated to pre-charging the capacitor 216 before polarity transition of the welding output current. The charging source also provides a trickle charge in the milli-amps range to initialize the snubber capacitor 183. An active snubber circuit 181, having a diode 182 and a capacitor 183, is used to limit the voltage across the current switching circuit 180 (e.g., somewhere between 300 V and 600 V) to cause the output current through the output circuit path to decay quickly. The anti-parallel diodes of the switching transistors 211, 212, 213, and 214 of the bridge circuit 160 complete the snubber/decay path.

Figure 3A:
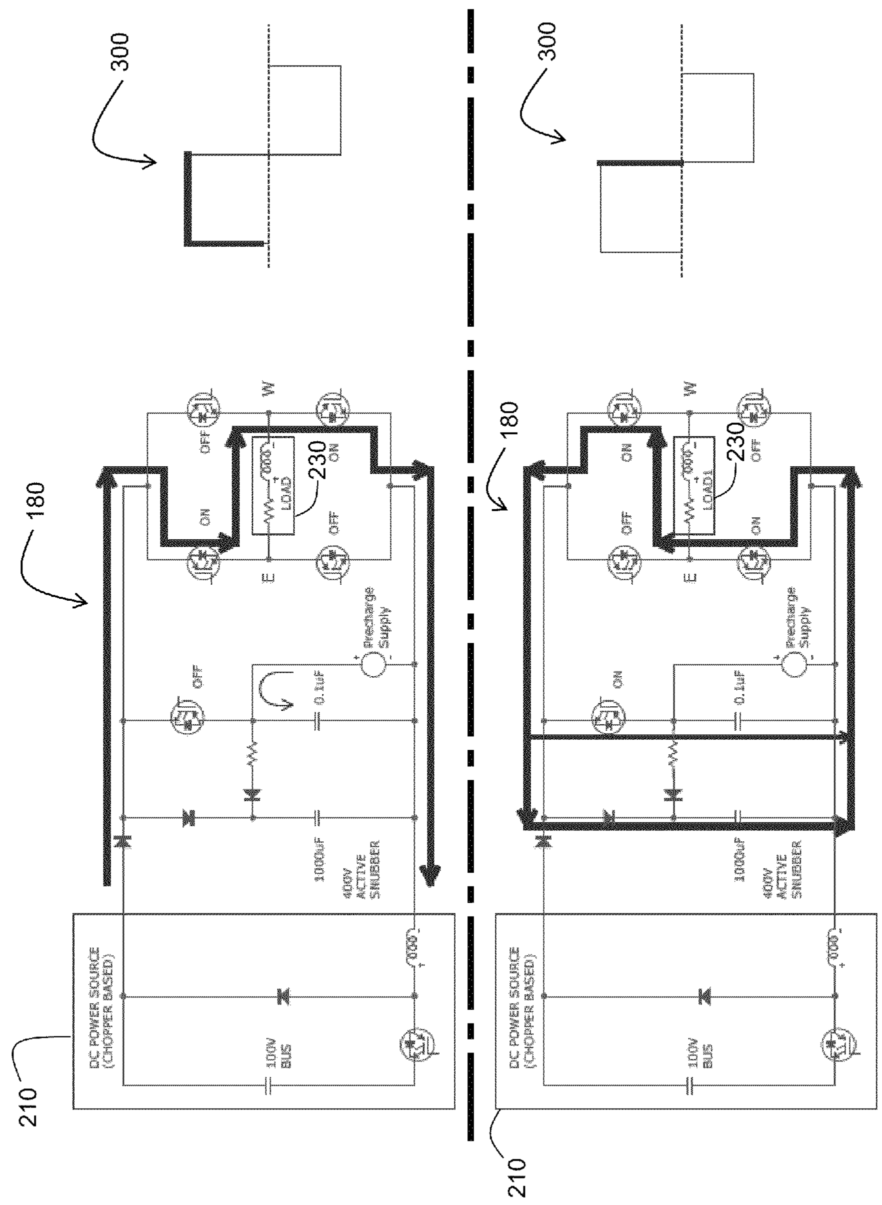
FIGS. 3A-3C illustrate the operation of the welding power source in FIG. 2 when implementing an AC welding output current waveform.
Figure 3B:
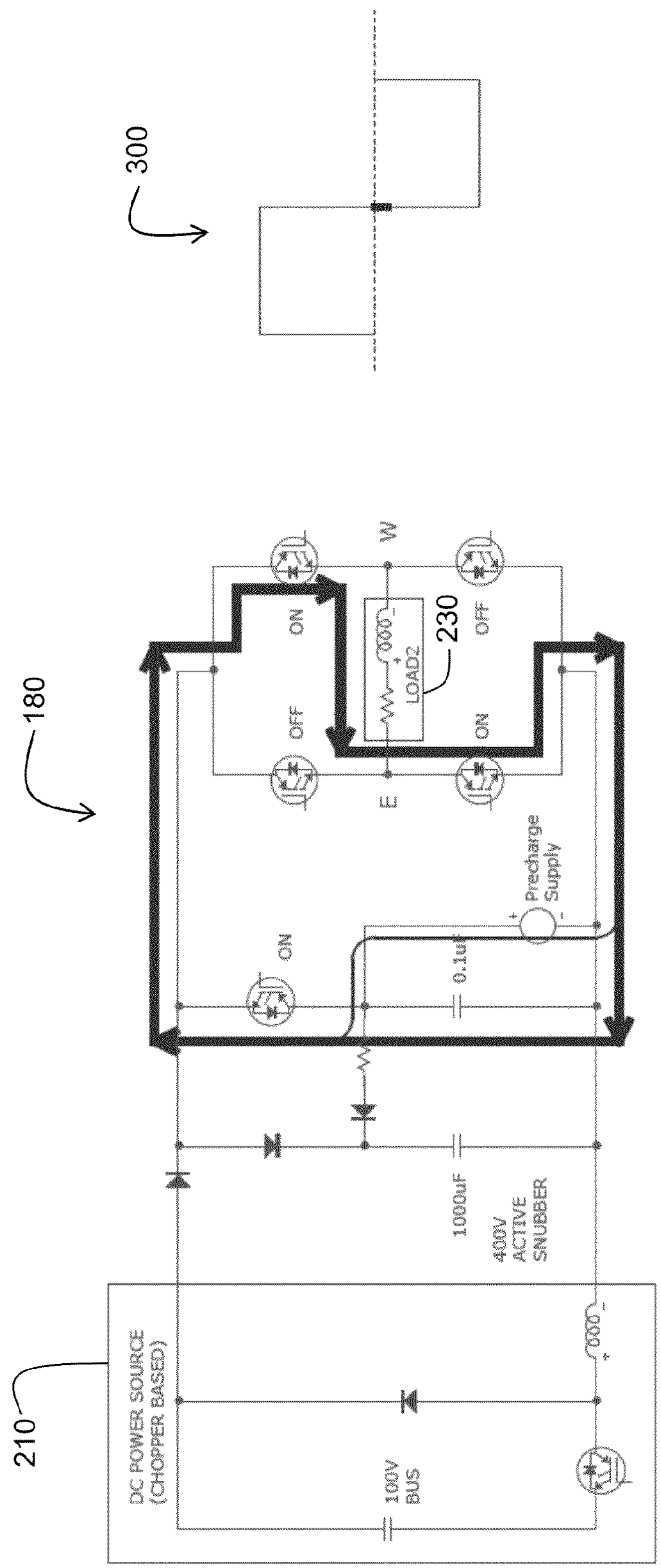
Figure 3C:
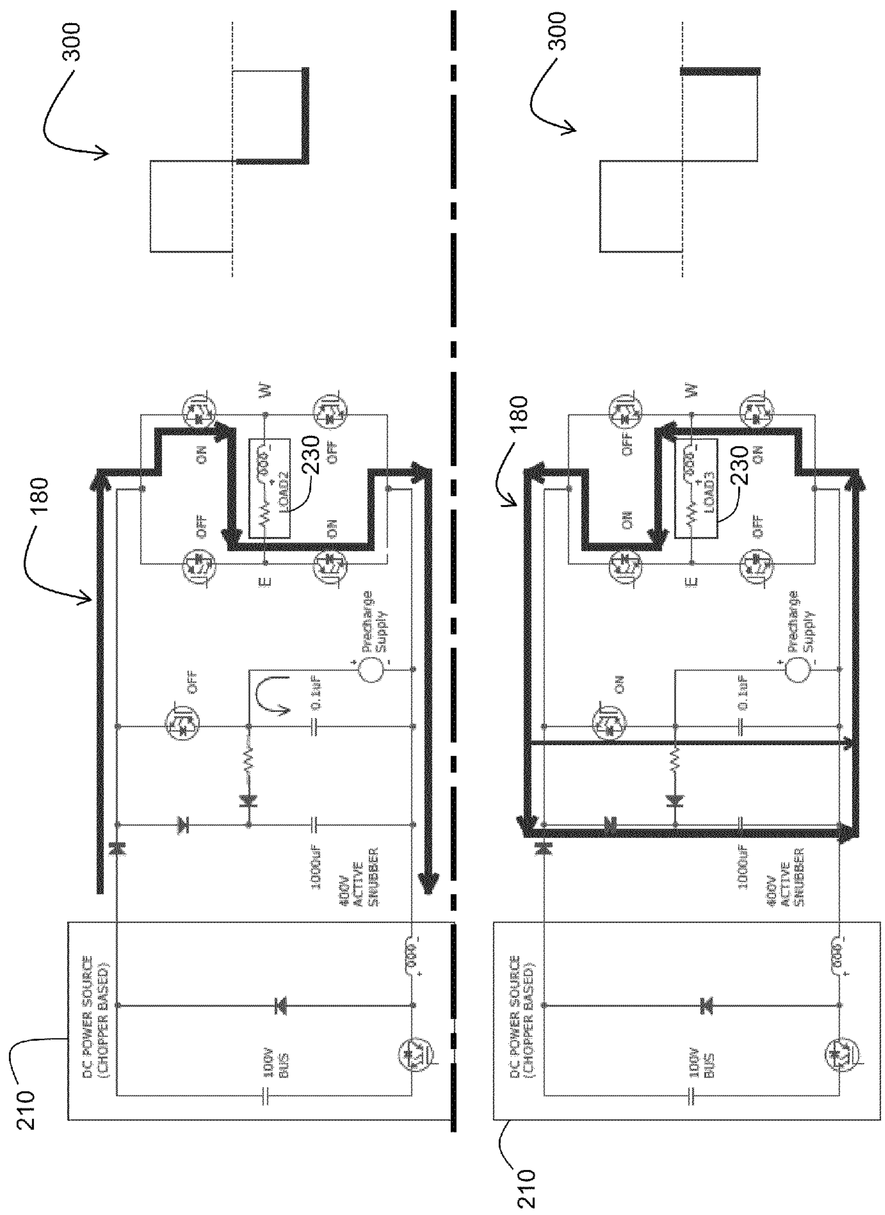

The current switching circuit 180 of FIG. 2 provides for AC welding operation and provides a voltage at the welding output of the welding power source being of sufficient magnitude to re-establish the welding arc between the electrode E and the workpiece W during polarity reversals of the welding process, as described herein with respect to FIGS. 3A-3C. Welding output terminals 191 and 192 are shown and represent the welding output of the welding power source to which the electrode E and the workpiece W may be connected through a welding cable path.

In accordance with an embodiment, the pre-charge capacitor 216 has a capacitance value of less than one micro-farad and the dedicated charging source 217 provides a current in the range of, for example, 1-100 milli-amps. The capacitor 216 is sized to provide a large enough voltage between the electrode and the workpiece to quickly and reliably re-ignite the arc immediately after the arc goes out due to the output current switching direction (polarity reversal/switching). During zero current crossing (polarity reversal/switching), the arc extinguishes and the high voltage (e.g., 200 to 400 VDC) provided by the energy from the capacitor 216 of the superposition circuit 170 is used to re-establish the arc in the opposite polarity. The capacitor 216 provides the arc-igniting voltage level in both polarities (i.e., when crossing the zero current point from either the positive direction or the negative direction).

FIGS. 3A-3C illustrate the operation of the welding power source in FIG. 2 when implementing an AC welding output current waveform (e.g., represented as a simple square waveform). The load 230 shown in FIGS. 3A-3C represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 3A, during the positive current portion of an AC waveform 300 (see thicker dark lines of the waveform 300) produced by the welding power source, current flows predominantly from the power conversion circuit 210, through the switching transistor 211 of the bridge circuit 160, through the load 230 (in the positive direction), through the switching transistor 214 of the bridge circuit 160, and back to the power conversion circuit 210 (see thick arrows). Also, a pre-charge current flows from the charging source 217 and charges the capacitor 216 to, for example, a minimum voltage for re-igniting the arc (see less thick arrow).

Referring to the bottom portion of FIG. 3A, during the positive current decay portion of the AC waveform 300 (see thicker dark line of the waveform 300), current flows from the load 230 (in the positive direction), through the anti-parallel diode of the switching transistor 213 of the bridge circuit 160, through the active snubber 181, through the anti-parallel diode of the switching transistor 212, and back to the load 230 (see thick arrows). Also, some of the current flows through the anti-parallel diode of the switching transistor 215 of the superposition circuit 170 and may further charge the capacitor 216 (see less thick arrow). This further charging from the load provides a self-regulating feature by providing additional energy that may be needed to re-ignite the arc if, for example, the welding cable is a long cable having a large inductance. During current decay, the bridge circuit 160 changes polarity. As the current through the load drops toward zero, the arc extinguishes.

The superposition circuit applies a voltage across the load to re-ignite the arc in the opposite polarity. Current from the power conversion circuit can begin to flow again through the load in the opposite direction. The arc re-establishes quickly and any over-shoot of the welding output current is limited by the energy stored in the capacitor 216 of the superposition circuit. Without the superposition circuit, the power conversion circuit would attempt to re-establish the arc. However, since the voltage provided by the power conversion circuit is usually limited (e.g., to 100 VDC), re-establishment of the arc may not occur.

Referring to FIG. 3B, during the polarity transition portion of the AC waveform 300 (see thicker dark line of the waveform 300), no significant current is provided by the power conversion circuit 210. The arc between the electrode E and the workpiece W briefly extinguishes. However, energy stored in the capacitor 216 provides an arc-igniting voltage between the electrode E and the workpiece W. The energy from the capacitor 216 of the superposition circuit 170 is released and current flows from the capacitor 216 through the switching transistor 215 of the superposition circuit 170, through the switching transistor 213 of the bridge circuit 160, through the load 230 (in the negative direction), through the switching transistor 212 of the bridge circuit 160, and back to the capacitor 216 (see arrows). As a result, the arc between the electrode E and the workpiece W quickly re-ignites in the negative direction.

Referring to the top portion of FIG. 3C, during the negative current portion of the AC waveform 300 (see thicker dark lines of the waveform 300) produced by the welding power source, current flows predominantly from the power conversion circuit 210, through the switching transistor 213 of the bridge circuit 160, through the load 230 (in the negative direction), through the switching transistor 212 of the bridge circuit 160, and back to the power conversion circuit 210 (see thick arrows). Also, a pre-charge current flows from the dedicated charging source 217 and charges the capacitor 216 to a minimum voltage for re-igniting the arc (see less thick arrow).

Referring to the bottom portion of FIG. 3C, during the negative current decay portion of the AC waveform 300 (see thicker dark line of the waveform 300), current flows predominantly from the load 230 (in the negative direction), through the anti-parallel diode of switching transistor 211 of the bridge circuit 160, through the snubber circuit 181, through the anti-parallel diode of switching transistor 214 of the bridge circuit 160, and back to the load 230. Also, some of the current flows through the anti-parallel diode of the switching transistor 215 of the superposition circuit 170 and may further charge the capacitor 216 (see less thick arrow). This further charging from the load provides a self-regulating feature by providing additional energy that may be needed to re-ignite the arc if, for example, the welding cable is a long cable having a large inductance.

Upon making the transition back to the positive portion of the waveform 300 (i.e., the waveform is repeating), in a similar manner to that of FIG. 3B, the capacitor 216 will release its stored energy through the load (but in the positive direction) via the switching transistor 215 of the superposition circuit 170, and the switching transistors 211 and 214 of the bridge circuit 160, causing the arc between the electrode E and the workpiece W to quickly re-ignite in the positive direction.

Figure 4:
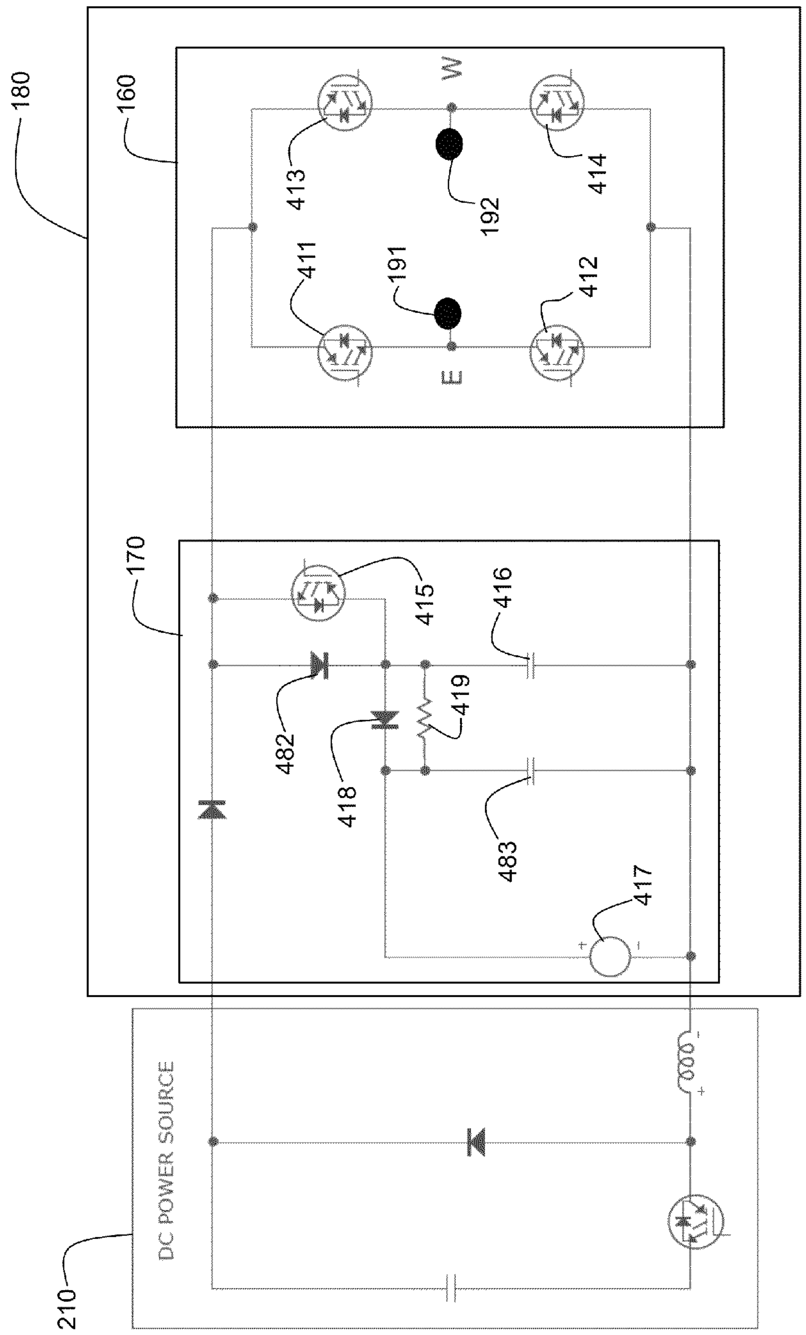
FIG. 4 illustrates a schematic diagram of a second exemplary embodiment of a portion of the welding power source of FIG. 1 having a bridge circuit and a superposition circuit.

FIG. 4 illustrates a schematic diagram of a second exemplary embodiment of a portion of the welding power source 100 of FIG. 1 having a bridge circuit 160 and a superposition circuit 170. Also illustrated in FIG. 4 is a portion 210 of the power conversion circuit 110, where the power conversion circuit 110 provides a DC+output (e.g., a chopper-based circuit). The current switching circuit 180 of FIG. 4 is in the form of a full bridge topology that may be used with almost any power source topology, providing flexibility and the potential to be added to existing designed power sources, and providing AC current switching through the welding output circuit path.

The bridge circuit 160 includes switching transistors 411, 412, 413, and 414. The superposition circuit 170 includes switching transistor 415, pre-charge capacitor 416, dedicated charging source 417, diode 418, and resistor 419. In accordance with an embodiment, the switching transistors are insulated gate bipolar transistors (IGBTs). In accordance with an embodiment, the dedicated charging source 417 is a voltage supply created off of a transformer that is current limited and is dedicated to pre-charging the capacitor 416 before polarity transition of the welding output current. The charging source also provides a trickle charge in the milli-amps range to initialize the snubber capacitor 483. The superposition circuit 170 also includes an active snubber circuit having a diode 482 and a capacitor 483 that is used to limit the voltage across the current switching circuit 180 (e.g., somewhere between 300 V and 600 V) to cause the output current through the output circuit path to decay quickly. The anti-parallel diodes of the switching transistors 411, 412, 413, and 414 of the bridge circuit 160 complete the snubber/decay current path.

Figure 5A:
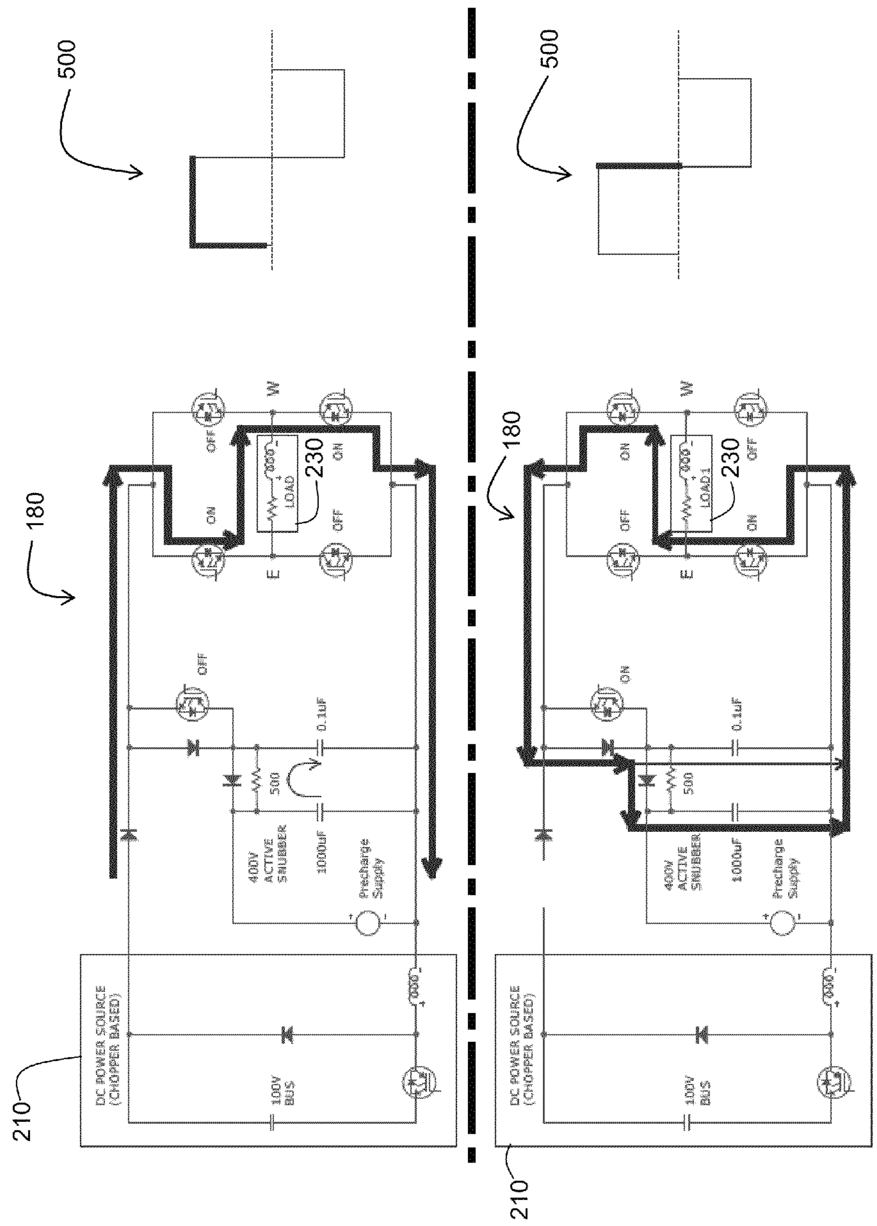
FIGS. 5A-5C illustrate the operation of the welding power source in FIG. 4 when implementing an AC welding output current waveform.
Figure 5B:
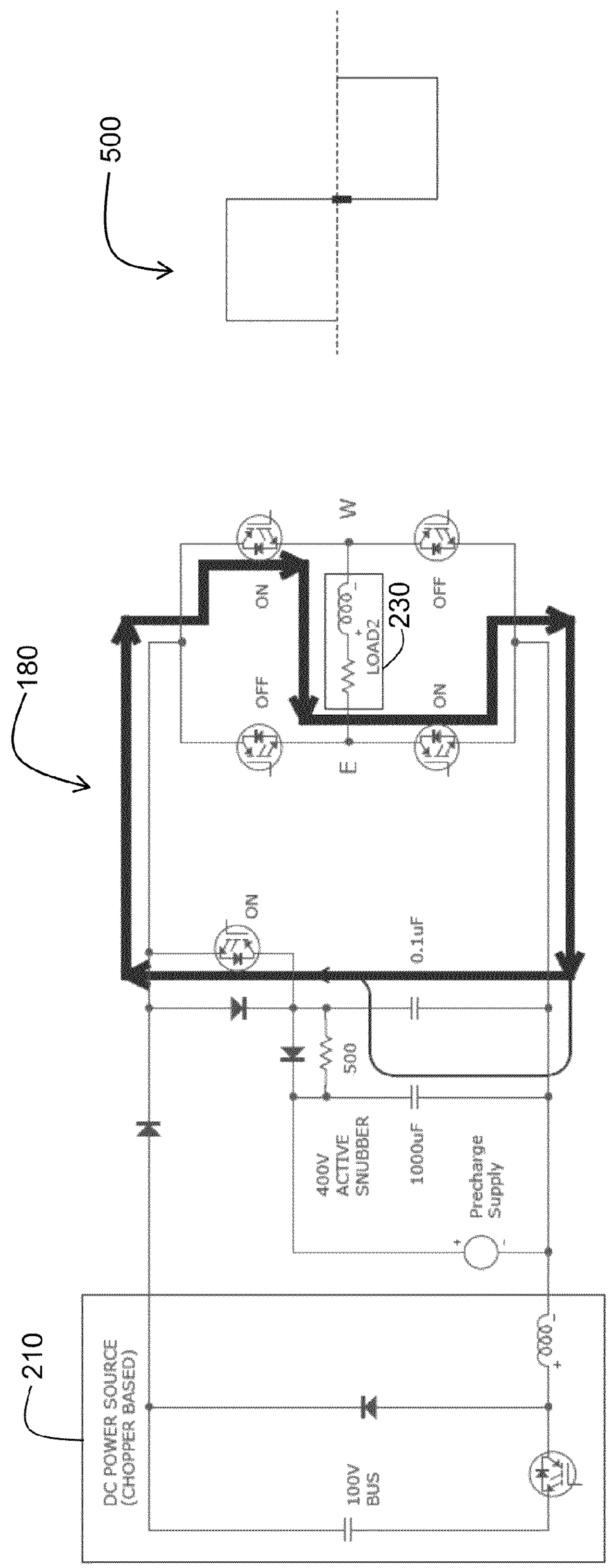
Figure 5C:
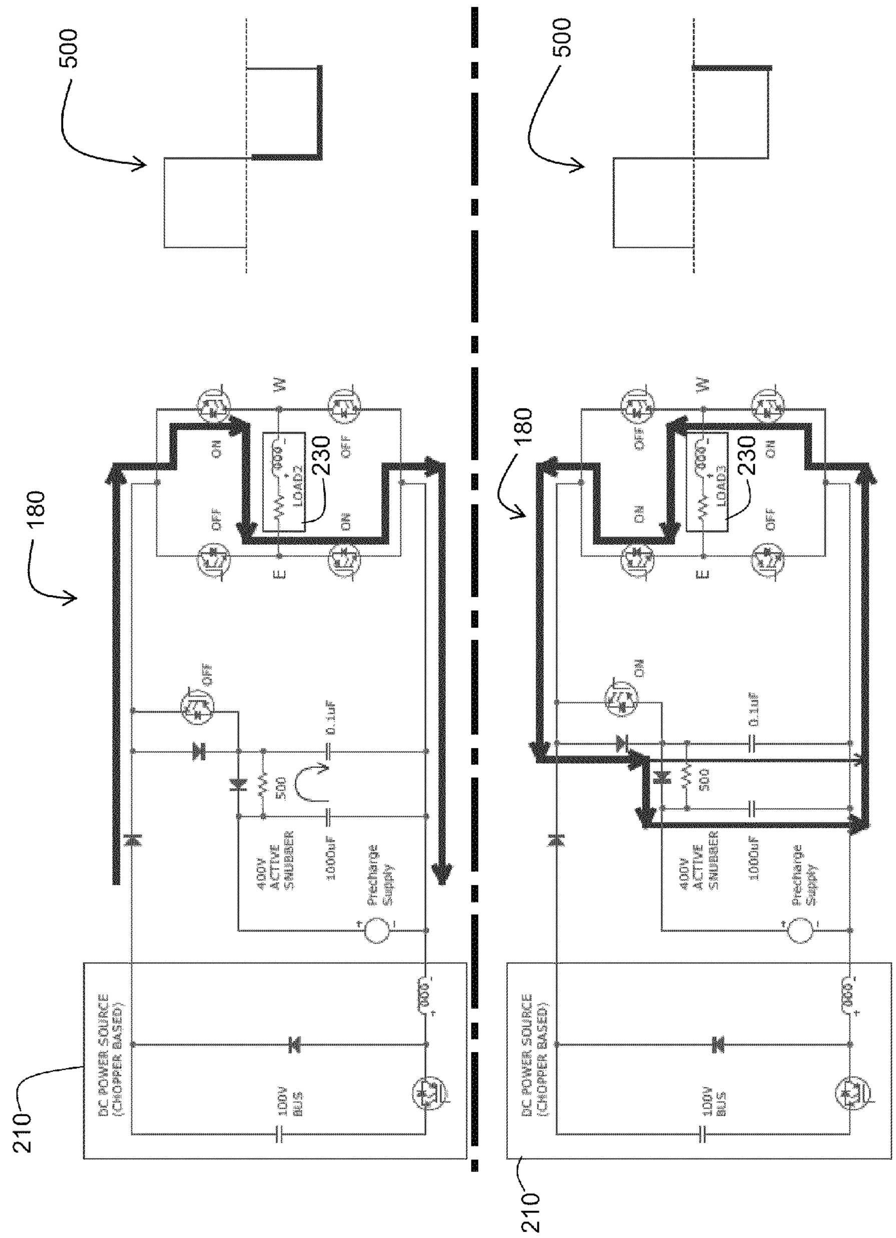

The current switching circuit 180 of FIG. 4 provides for AC welding operation and provides a voltage at the welding output of the welding power source being of sufficient magnitude to re-establish the welding arc between the electrode E and the workpiece W during polarity reversals of the welding process, as described herein with respect to FIGS. 5A-5C. Welding output terminals 191 and 192 are shown and represent the welding output of the welding power source to which the electrode E and the workpiece W may be connected through a welding cable path.

In accordance with an embodiment, the pre-charge capacitor 416 has a capacitance value of less than one micro-farad and the dedicated charging source 417 provides a current in the range of, for example, 1-100 milli-amps. The capacitor 416 is sized to provide a large enough voltage between the electrode and the workpiece to quickly and reliably re-ignite the arc immediately after the arc goes out due to the output current switching direction (polarity reversal/switching). During zero current crossing (polarity reversal/switching), the arc extinguishes and the high voltage (e.g., 200 to 400 VDC) provided by the energy from the capacitor 416 of the superposition circuit 170 is used to re-establish the arc in the opposite polarity. The capacitor 416 provides the arc-igniting voltage level in both polarities (i.e., when crossing the zero current point from either the positive direction or the negative direction).

During pre-charging, the transistor switch 415 is off and the active snubber capacitor 483 is charged first by the dedicated charging source 417. Subsequently, the capacitor 416 is charged off of the snubber capacitor 483. That is, the pre-charge capacitor 416 is indirectly charged by the dedicated charging source 417 via the snubber capacitor 483. Once the capacitor 416 is discharged to re-ignite the arc, additional energy may be pulled from the snubber circuit through the resistor 419 (e.g., about 500 ohms) which limits the current being drawn out of the snubber circuit. When the transistor switch 415 again shuts off, the process of pre-charging repeats. In accordance with an embodiment, an advisory circuit (not shown) monitors the active snubber capacitor 483 to maintain the voltage of the capacitor 483 at about 400 V, for example. This is accomplished by charging the snubber capacitor 483 from the power supply when the voltage is too low, and bleeding off energy from the capacitor 483 when the voltage is too high.

FIGS. 5A-5C illustrate the operation of the welding power source in FIG. 4 when implementing an AC welding output current waveform. The load 230 shown in FIGS. 5A-5C represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 5A, during the positive current portion of an AC waveform 500 (see thicker dark lines of the waveform 500) produced by the welding power source, current flows predominantly from the power conversion circuit 210, through the switching transistor 411 of the bridge circuit 160, through the load 230 (in the positive direction), through the switching transistor 414 of the bridge circuit 160, and back to the power conversion circuit 210 (see thick arrows). Also, a pre-charge current flows from the dedicated charging source 417. During pre-charging, the transistor switch 415 is off and the active snubber capacitor 483 is charged first by the charging source 417. Subsequently, the pre-charge capacitor 416 is charged off of the snubber capacitor 417 to, for example, a minimum voltage for re-igniting the arc (see less thick arrow).

Referring to the bottom portion of FIG. 5A, during the positive current decay portion of the AC waveform 500 (see thicker dark line of the waveform 500), current flows predominantly from the load 230 (in the positive direction), through the anti-parallel diode of the switching transistor 413 of the bridge circuit 160, through the snubber circuit, through the anti-parallel diode of the switching transistor 412, and back to the load 230 (see thick arrows). Also, some of the current flows to the pre-charge capacitor 416 of the superposition circuit and may further charge the capacitor 416 (see less thick arrow). This further charging from the load provides a self-regulating feature by providing additional energy that may be needed to re-ignite the arc if, for example, the welding cable is a long cable having a large inductance. During current decay, the bridge circuit 160 changes polarity. As the current through the load drops toward zero, the arc extinguishes.

The superposition circuit applies a voltage across the load to re-ignite the arc in the opposite polarity. Current from the power conversion circuit can begin to flow again through the load in the opposite direction. The arc re-establishes quickly and any over-shoot of the welding output current is limited by the energy stored in the capacitor 416 of the superposition circuit. Without the superposition circuit, the power conversion circuit would attempt to re-establish the arc. However, since the voltage provided by the power conversion circuit is usually limited (e.g., to 100 VDC), re-establishment of the arc may not occur.

Referring to FIG. 58, during the polarity transition portion of the AC waveform 500 (see thicker dark line of the waveform 500), no significant current is provided by the power conversion circuit 210. The arc between the electrode E and the workpiece W briefly extinguishes. However, energy stored in the capacitor 416 provides an arc-igniting voltage between the electrode E and the workpiece W. The energy from the capacitor 416 of the superposition circuit 170 is released and current flows from the capacitor 416 through the switching transistor 415 of the superposition circuit 170, through the switching transistor 413 of the bridge circuit 160, through the load 230 (in the negative direction), through the switching transistor 412 of the bridge circuit 160, and back to the capacitor 416 (see thick arrows). Additional energy may be pulled from the snubber capacitor 483 (see less thick arrow) through the current limiting resistor 419. As a result, the arc between the electrode E and the workpiece W quickly re-ignites in the negative direction.

Referring to the top portion of FIG. 5C, during the negative current portion of the AC waveform 500 (see thicker dark lines of the waveform 500) produced by the welding power source, current flows predominantly from the power conversion circuit 210, through the switching transistor 413 of the bridge circuit 160, through the load 230 (in the negative direction), through the switching transistor 412 of the bridge circuit 160, and back to the power conversion circuit 210 (see thick arrows). Also, during pre-charging, the transistor switch 415 is off and the active snubber capacitor 483 is charged first by the dedicated charging source 417. Subsequently, the pre-charge capacitor 416 is charged off of the snubber capacitor 417 to, for example, a minimum voltage for re-igniting the arc (see less thick arrow).

Referring to the bottom portion of FIG. 5C, during the negative current decay portion of the AC waveform 500 (see thicker dark line of the waveform 500), current flows predominantly from the load 230 (in the negative direction), through the anti-parallel diode of the switching transistor 411 of the bridge circuit 160, through the snubber circuit, through the anti-parallel diode of the switching transistor 414 of the bridge circuit 160, and back to the load 230 (see thick arrows). Also, some of the current flows to the capacitor 416 of the superposition circuit and may further charge the capacitor 416 (see less thick arrow). This further charging from the load provides a self-regulating feature by providing additional energy that may be needed to re-ignite the arc if, for example, the welding cable is a long cable having a large inductance.

Upon making the transition back to the positive portion of the waveform 500 (i.e., the waveform is repeating), in a similar manner to that of FIG. 58, the pre-charge capacitor 416 will release its stored energy through the load (but in the positive direction) via the switching transistor 415 of the superposition circuit 170, and the switching transistors 411 and 414 of the bridge circuit 160, causing the arc between the electrode E and the workpiece W to quickly re-ignite in the positive direction.

Figure 6:
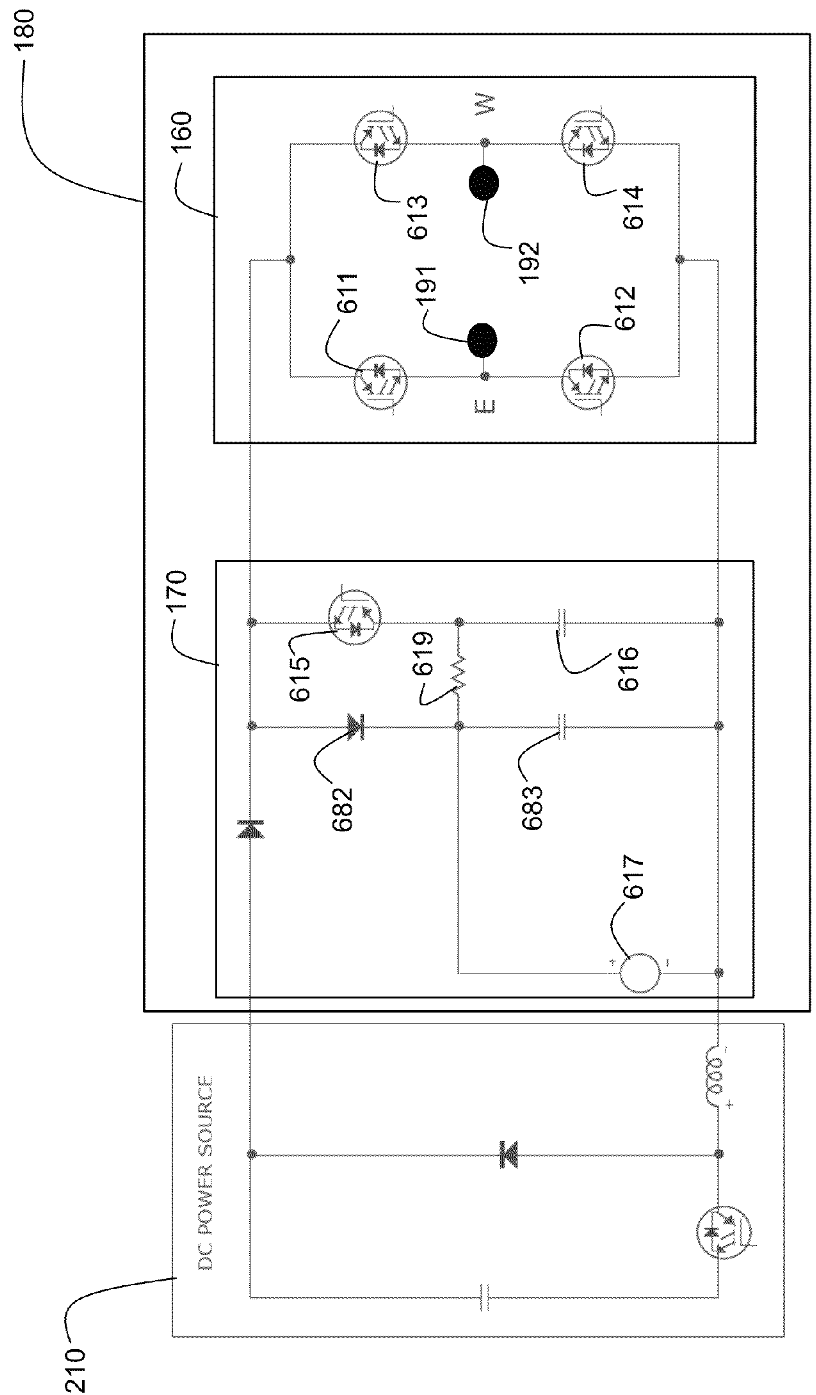
FIG. 6 illustrates a schematic diagram of a third exemplary embodiment of a portion of the welding power source of FIG. 1 having a bridge circuit and a superposition circuit.

FIG. 6 illustrates a schematic diagram of a third exemplary embodiment of a portion of the welding power source 100 of FIG. 1 having a bridge circuit 160 and a superposition circuit 170. Also illustrated in FIG. 6 is a portion 210 of the power conversion circuit 110, where the power conversion circuit 110 provides a DC+output (e.g., a chopper-based circuit). The current switching circuit 180 of FIG. 6 is in the form of a full bridge topology that may be used with almost any power source topology, providing flexibility and the potential to be added to existing designed power sources, and providing AC current switching through the welding output circuit path.

The bridge circuit 160 includes switching transistors 611, 612, 613, and 614. The superposition circuit 170 includes switching transistor 615, pre-charge capacitor 616, dedicated charging source 617, and resistor 619. In accordance with an embodiment, the switching transistors are insulated gate bipolar transistors (IGBTs). In accordance with an embodiment, the dedicated charging source is a voltage supply created off of a transformer that is current limited and is dedicated to pre-charging the capacitor 616 before polarity transition of the welding output current. The charging source 617 also provides a trickle charge in the milli-amps range to initialize the snubber capacitor 683. The superposition circuit 170 also includes an active snubber circuit having a diode 682 and a capacitor 683 that is used to limit the voltage across the current switching circuit 180 (e.g., somewhere between 300 V and 600 V) to cause the output current through the output circuit path to decay quickly. The anti-parallel diodes of the switching transistors 611, 612, 613, and 614 of the bridge circuit 160 complete the snubber/decay current path.

Figure 7A:
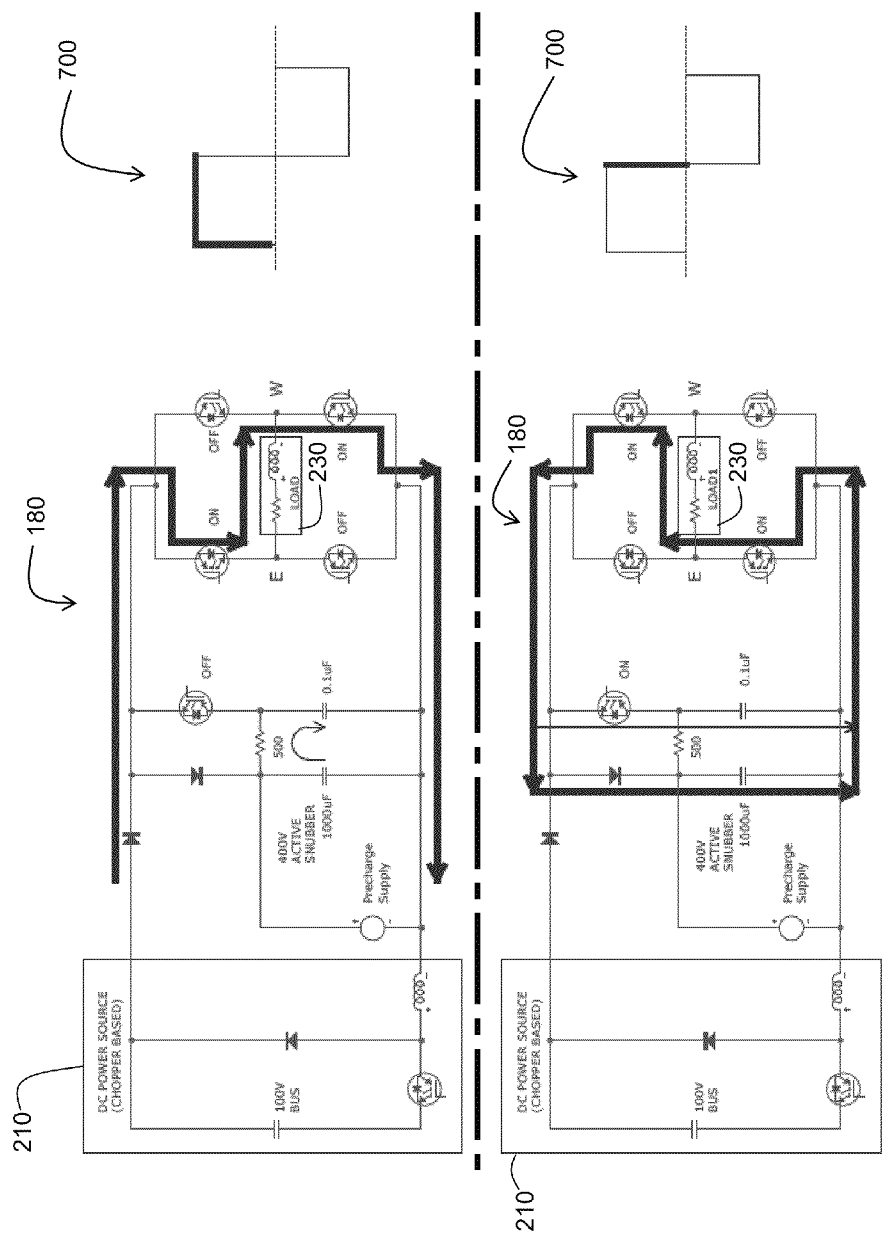
FIGS. 7A-7C illustrate the operation of the welding power source in FIG. 6 when implementing an AC welding output current waveform.
Figure 7B:
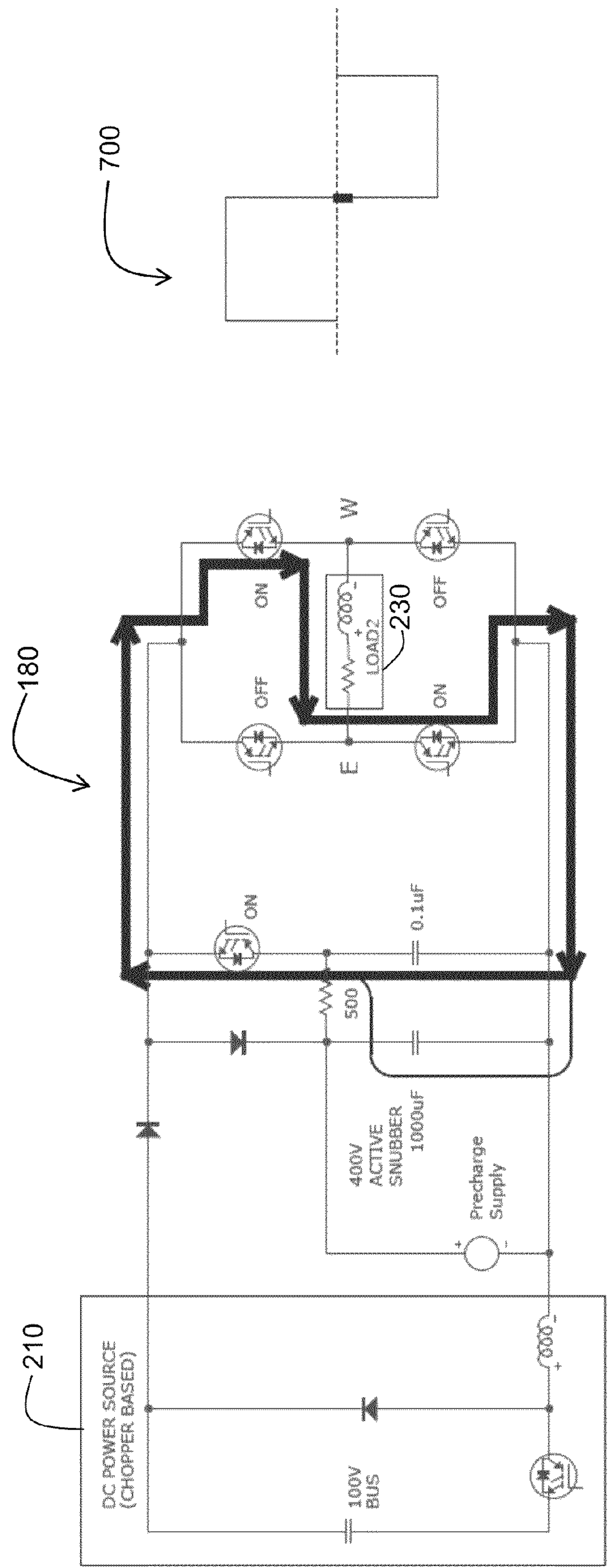
Figure 7C:
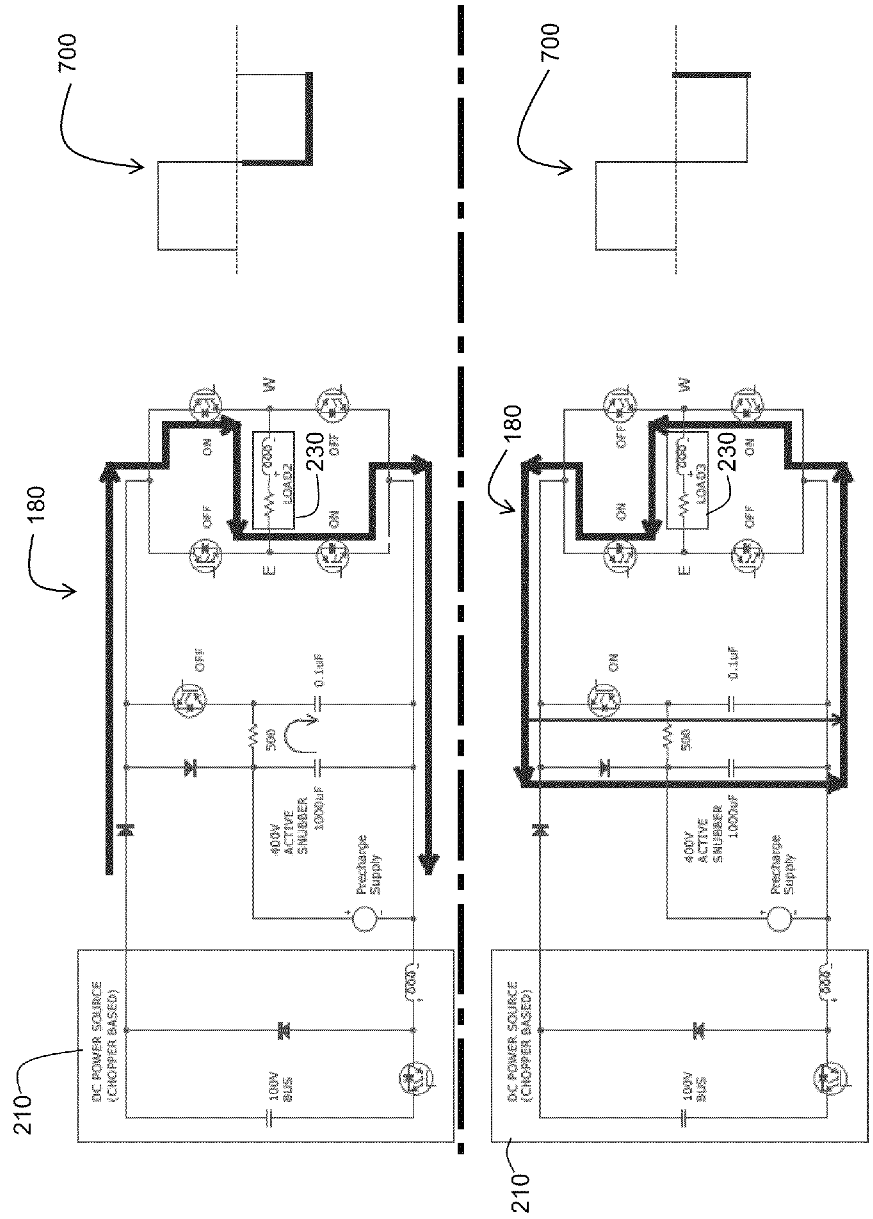

The current switching circuit 180 of FIG. 6 provides for AC welding operation and provides a voltage at the welding output of the welding power source being of sufficient magnitude to re-establish the welding arc between the electrode E and the workpiece W during polarity reversals of the welding process, as described herein with respect to FIGS. 7A-7C. Welding output terminals 191 and 192 are shown and represent the welding output of the welding power source to which the electrode E and the workpiece W may be connected through a welding cable path.

In accordance with an embodiment, the pre-charge capacitor 616 has a capacitance value of less than one micro-farad and the dedicated charging source 617 provides a current in the range of, for example, 1-100 milli-amps. The capacitor is sized to provide a large enough voltage between the electrode and the workpiece to quickly and reliably re-ignite the arc immediately after the arc goes out due to the output current switching direction (polarity reversal/switching). During zero current crossing (polarity reversal/switching), the arc extinguishes and the high voltage (e.g., 200 to 400 VDC) provided by the energy from the capacitor 616 of the superposition circuit 170 is used to re-establish the arc in the opposite polarity. The pre-charge capacitor 616 provides the arc-igniting voltage level in both polarities (i.e., when crossing the zero current point from either the positive direction or the negative direction).

During pre-charging, the transistor switch 615 is off and the active snubber capacitor 683 is charged first by the dedicated charging source 617. Subsequently, the capacitor 616 is charged off of the snubber capacitor 683. That is, the pre-charge capacitor 616 is indirectly charged by the dedicated charging source 617 via the snubber capacitor 683. Once the capacitor 616 is discharged to re-ignite the arc, additional energy may be pulled from the snubber circuit through the resistor 619 (e.g., about 500 ohms) which limits the current being drawn out of the snubber circuit. When the transistor switch 615 again shuts off, the process of pre-charging repeats. In accordance with an embodiment, an advisory circuit (not shown) monitors the active snubber capacitor 683 to maintain the voltage of the capacitor 683 at about 400 V, for example. This is accomplished by charging the snubber capacitor 683 from the power supply when the voltage is too low, and bleeding off energy from the capacitor 683 when the voltage is too high.

FIGS. 7A-7C illustrate the operation of the welding power source in FIG. 6 when implementing an AC welding output current waveform. The load 230 shown in FIGS. 7A-7C represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 7A, during the positive current portion of an AC waveform 700 (see thicker dark lines of the waveform 700) produced by the welding power source, current flows predominantly from the power conversion circuit 210, through the switching transistor 611 of the bridge circuit 160, through the load 230 (in the positive direction), through the switching transistor 614 of the bridge circuit 160, and back to the power conversion circuit 210 (see thick arrows). Also, a pre-charge current flows from the dedicated charging source 617. During pre-charging, the transistor switch 615 is off and the active snubber capacitor 683 is charged first by the charging source 617. Subsequently, the pre-charge capacitor 616 is charged off of the snubber capacitor 617 to, for example, a minimum voltage for re-igniting the arc (see less thick arrow).

Referring to the bottom portion of FIG. 7A, during the positive current decay portion of the AC waveform 700 (see thicker dark line of the waveform 700), current flows predominantly from the load 230 (in the positive direction), through the antiparallel diode of the switching transistor 613 of the bridge circuit 160, through the active snubber circuit, through the anti-parallel diode of the switching transistor 612 of the bridge circuit 160, and back to the load 230 (see thick arrows). Also, some of the current flows to the capacitor 616 of the superposition circuit and may further charge the capacitor 616 (see less thick arrow). This further charging from the load provides a self-regulating feature by providing additional energy that may be needed to re-ignite the arc if, for example, the welding cable is a long cable having a large inductance. During current decay, the bridge circuit 160 changes polarity. As the current through the load drops toward zero, the arc extinguishes.

The superposition circuit applies a voltage across the load to re-ignite the arc in the opposite polarity. Current from the power conversion circuit can begin to flow again through the load in the opposite direction. The arc re-establishes quickly and any over-shoot of the welding output current is limited by the energy stored in the capacitor 616 of the superposition circuit. Without the superposition circuit, the power conversion circuit would attempt to re-establish the arc. However, since the voltage provided by the power conversion circuit is usually limited (e.g., to 100 VDC), re-establishment of the arc may not occur.

Referring to FIG. 78, during the polarity transition portion of the AC waveform 700 (see thicker dark line of the waveform 700), no significant current is provided by the power conversion circuit 210. The arc between the electrode E and the workpiece W briefly extinguishes. However, energy stored in the pre-charge capacitor 616 provides an arc-igniting voltage between the electrode E and the workpiece W. The energy from the capacitor 616 of the superposition circuit 170 is released and current flows from the capacitor 616 through the switching transistor 615 of the superposition circuit 170, through the switching transistor 613 of the bridge circuit 160, through the load 230 (in the negative direction), through the switching transistor 612 of the bridge circuit 160, and back to the capacitor 616 (see thick arrows). Additional energy may be pulled from the snubber capacitor 483 (see less thick arrow) through the current limiting resistor 619. As a result, the arc between the electrode E and the workpiece W quickly re-ignites in the negative direction.

Referring to the top portion of FIG. 7C, during the negative current portion of the AC waveform 700 (see thicker dark lines of the waveform 700) produced by the welding power source, current flows predominantly from the power conversion circuit 210, through the switching transistor 613 of the bridge circuit 160, through the load 230 (in the negative direction), through the switching transistor 612 of the bridge circuit 160, and back to the power conversion circuit 210 (see thick arrows). Also, during pre-charging, the transistor switch 615 is off and the active snubber capacitor 683 is charged first by the dedicated charging source 617. Subsequently, the pre-charge capacitor 616 is charged off of the snubber capacitor 683 to, for example, a minimum voltage for re-igniting the arc (see less thick arrow).

Referring to the bottom portion of FIG. 7C, during the negative current decay portion of the AC waveform 700 (see thicker dark line of the waveform 700), current flows predominantly from the load 230 (in the negative direction), through the anti-parallel diode of the switching transistor 611 of the bridge circuit 160, through the snubber circuit, through the anti-parallel diode of the switching transistor 614 of the bridge circuit 160, and back to the load 230 (see thick arrows). Also, some of the current flows to the capacitor 616 of the superposition circuit and may further charge the capacitor 616 (see less thick arrow). This further charging from the load provides a self-regulating feature by providing additional energy that may be needed to re-ignite the arc if, for example, the welding cable is a long cable having a large inductance.

Upon making the transition back to the positive portion of the waveform 700 (i.e., the waveform is repeating), in a similar manner to that of FIG. 78, the pre-charge capacitor 616 will release its stored energy through the load (but in the positive direction) via the switching transistor 615 of the superposition circuit 170, and the switching transistors 611 and 614 of the bridge circuit 160, causing the arc between the electrode E and the workpiece W to quickly re-ignite in the positive direction.

In summary, systems and methods providing an energy limited arc re-ignition voltage for AC arc welding processes to re-ignite an arc during polarity transitions are disclosed. In arc welding power source embodiments, configurations of bridge and superposition circuits allow for the directional switching of the welding output current through the welding output circuit path and provide a voltage between the electrode and the workpiece of the welding output circuit path that is sufficient to re-ignite the arc during polarity transition of the output current. The superposition circuit provides a capacitor for storing energy from a dedicated charging source which produces the voltage level for re-igniting the arc during the zero crossing of the output current in both polarities.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A welding power source comprising:

a power conversion circuit configured to convert an input current to an output current;

a controller;

a bridge circuit operatively connected to the power conversion circuit and configured to switch a direction of the output current through a welding output circuit path operatively connected to a welding output of the welding power source at the command of the controller; and a superposition circuit, including at least one capacitor and at least one dedicated charging source configured to directly or indirectly charge the at least one capacitor, operatively connected to the bridge circuit and configured to provide a voltage between an electrode and a workpiece of the welding output circuit path sufficient for arc re-ignition during polarity transition of the output current.

2. The welding power source of claim 1, wherein the superposition circuit includes at least one resistor operatively connected to the at least one capacitor.

3. The welding power source of claim 1, wherein the superposition circuit includes at least one switching transistor operatively connected to the at least one capacitor and configured to switch on and off at the command of the controller.

4. The welding power source of claim 1, wherein a capacitance value of the at least one capacitor is less than one micro-farad.

5. The welding power source of claim 1, wherein the at least one dedicated charging source is a current limited voltage supply.

6. The welding power source of claim 1, wherein the power conversion circuit, the bridge circuit, and the superposition circuit are configured to provide an AC welding operation at the command of the controller of the welding power source.

7. The welding power source of claim 1, wherein the power conversion circuit includes a DC output topology.

8. The welding power source of claim 1, wherein the power conversion circuit is a chopper-based circuit.

9. The welding power source of claim 1, wherein the bridge circuit is configured as a full bridge circuit.

10. The welding power source of claim 1, wherein the bridge circuit includes at least four switching transistors.

11. A welding power source comprising:

means for converting an input current to an output current;

means for switching a direction of the output current through a welding output circuit path operatively connected to a welding output of the welding power source to provide at least an AC welding operation; and means for applying a voltage between a welding electrode and a welding workpiece of the welding output circuit path during a polarity transition of the output current to automatically re-establish an arc between the welding electrode and the workpiece in an opposite polarity.

12. A method comprising:

converting an input current to an output current in a welding power source;

pre-charging at least one capacitor of the welding power source to an arc-re-igniting voltage level directly or indirectly from at least one dedicated charging source;

switching a direction of the output current through a welding output circuit path operatively connected to a welding output of the welding power source from a first direction to a second direction at the command of a controller of the welding power source; and applying the arc re-igniting voltage level from the at least one capacitor between a welding electrode and a workpiece of the welding output circuit path to automatically re-ignite an arc between the electrode and the workpiece in the second direction as part of switching to the second direction.

13. The method of claim 12, further comprising:

pre-charging the at least one capacitor of the welding power source to the arc re-igniting voltage level directly or indirectly from the at least one dedicated charging source;

switching a direction of the output current through the welding output circuit path from the second direction to the first direction at the command of the controller of the welding power source; and applying the arc re-igniting voltage level from the at least one capacitor between the welding electrode and the workpiece of the welding output circuit path to automatically re-ignite an arc between the electrode and the workpiece in the first direction as part of switching to the first direction.

14. The method of claim 13, further comprising further charging the at least one capacitor of the welding power source with energy from a load connected to the welding power source during a current decay portion of the output current to self-regulate arc re-ignition based on characteristics of the load.

15. A welding power source comprising:

a bridge circuit configured to provide an AC welding output current; and a superposition circuit, including at least one capacitor and at least one dedicated charging source configured to directly or indirectly charge the at least one capacitor, operatively connected to the bridge circuit and configured to provide a voltage at a welding output of the welding power source being of sufficient magnitude to automatically re-ignite an arc in an output circuit path connected to the welding output upon reversal of a polarity of the welding output current through the output circuit path.

16. The welding power source of claim 15, wherein the superposition circuit includes at least one resistor operatively connected to the at least one capacitor.

17. The welding power source of claim 15, wherein the superposition circuit includes at least one switching transistor operatively connected to the at least one capacitor and configured to switch on and off at the command of the welding power source.

18. A welding power source comprising a current switching circuit having at least one pre-charge capacitor and at least one dedicated charging source configured to directly or indirectly charge the capacitor, wherein the at least one pre-charge capacitor and the at least one dedicated charging source are configured to provide a voltage across a load connected to a welding output of the welding power source sufficient to re-ignite a welding arc across the load upon reversal of a polarity of a welding output current through the load.

19. The welding power source of claim 18, wherein the current switching circuit is configured as a full bridge circuit.

20. The welding power source of claim 18, wherein the current switching circuit includes at least one resistor operatively connected to the at least one pre-charge capacitor.

21. The welding power source of claim 18, wherein the current switching circuit includes at least one switching transistor operatively connected to the at least one pre-charge capacitor and configured to switch on and off at the command of the welding power source.

* * * * *